(12) United States Patent
Kobatake et al.

(10) Patent No.: US 7,883,302 B2
(45) Date of Patent: Feb. 8, 2011

(54) MACHINE TOOL

(75) Inventors: Kunichi Kobatake, Tokyo (JP); Kiyoshi Shimogai, Tokyo (JP); Hisato Tokunaga, Tokyo (JP); Hiroshi Takei, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 776 days.

(21) Appl. No.: 11/911,451

(22) PCT Filed: Nov. 22, 2005

(86) PCT No.: PCT/JP2005/021409

§ 371 (c)(1),
(2), (4) Date: Oct. 12, 2007

(87) PCT Pub. No.: WO2006/112074

PCT Pub. Date: Oct. 26, 2006

(65) Prior Publication Data

US 2008/0317561 A1    Dec. 25, 2008

(30) Foreign Application Priority Data

Apr. 13, 2005    (JP) .............................. 2005-115326

(51) Int. Cl.
*B23Q 11/10*    (2006.01)
(52) U.S. Cl. ............................. 409/136; 408/56; 408/57
(58) Field of Classification Search ................... 408/56, 408/57, 59, 227, 231, 233, 713; 409/135–136, 409/230; *B23Q 11/10; B23B 51/06*
See application file for complete search history.

(56) References Cited

U.S. PATENT DOCUMENTS

| 4,636,118 A | * | 1/1987 | Hunt | ........................... 409/136 |
| 4,764,062 A | * | 8/1988 | Hunt | ........................... 409/136 |
| 5,613,812 A | * | 3/1997 | Levan et al. | ................. 409/136 |

FOREIGN PATENT DOCUMENTS

| JP | 62-271674 | 11/1987 |
| JP | 4-89610 | 8/1992 |
| JP | 05-337713 | 12/1993 |
| JP | 08-039387 | 2/1996 |
| JP | 08-057742 | 3/1996 |
| JP | 2001-087906 | 4/2001 |
| JP | 2003-001545 | 1/2003 |
| SU | 1126390 A | * 11/1984 |

* cited by examiner

*Primary Examiner*—Daniel W Howell
(74) *Attorney, Agent, or Firm*—Rankin, Hill & Clark LLP

(57) ABSTRACT

A cutting tool holder unit is composed of a cutting tool holder adapted to detachably mount a cutting tool thereon, and a front cover of a flange shape slidably fitted into a side of the cutting took holder mounted on a multi-spindle head. A groove formed on the inner circumferential surface of the front cover is slidably fitted into a groove formed on the cutting tool holder to form a cutting oil circulating channel and a cutting oil injection port is opened at an upstream position of a cutting tool mounting section relative to the direction of rotation of the cutting tool holder.

2 Claims, 4 Drawing Sheets

MACHINE TOOL

TECHNICAL FIELD

The present invention relates to a machine tool for processing a workpiece such as a cylinder head by mounting, for example, a cut-processing jig on a multi-spindle head.

BACKGROUND ART

Cut-processing of a metal material is generally conducted in such a manner that a cutting tool holder on which a cutting tool is mounted is installed on a head of a machine tool, rotation of a motor on the head side is transmitted to the cutting tool holder, and the rotating cutting tool is applied to a metal workpiece to be processed while cutting oil is poured on the workpiece. However, in the case where the workpiece has a complicated shape, it is often the case that the cutting oil can not be fully supplied for the reason that the sections to be cut are secluded and the like. When supply of the cutting oil is not sufficient, the temperature of the cutting sections rises suddenly due to the heat caused by friction. As a result, problems such as the processing accuracy deteriorates and the life of the cutting tool is shortened occur.

For example, a valve seat made of a sintered material is embedded in a valve mounting section of a cylinder head of a motor vehicle to secure the airtightness of the valve. Surface processing of this valve seat is currently conducted by a cutting tool attached to a multi-spindle head. However, since the processing surface of the valve seat is situated on the inner side of the cylinder head, when the cutting tool is inserted therein, only a few millimeters of space is left between the workpiece and the cutting tool and as a result, the cutting oil can not be supplied to the processing section. Accordingly, it is also the case that the cutting oil is supplied from the workpiece side, that is, from a guide orifice within the cylinder. However, it is often the case that reaming of the guide orifice is conducted at the same time to increase the working efficiency. In this case, since the guide orifice is closed up by a reaming tool, it is also difficult to adopt this method. In this manner, it is necessary to provide piping for the cutting oil inside a cutting tool holder.

As an example of a technique whereby piping for the cutting oil is provided inside the cutting tool holder, Japanese Patent Application Publication No. 8-39387 discloses a structure wherein the cutting oil supplied through a cutting oil supply orifice provided to penetrate a cutter body is supplied to a cutting face through a cutting oil supply groove provided on a throwaway chip.

Further, in Japanese Patent Application Publication No. 8-57742, a nozzle device is described, in which a plurality of nozzle units adapted to communicate with a cutting oil supply source is swingably disposed on the outer periphery of a main axis of a machine tool or at the tip of a robot arm, the direction of each nozzle is swung all together by a separately provided driving source, and cutting oil is supplied from the cutting oil supply source.

Japanese Patent Application Publication No. 2001-87906 describes a cutting tool which includes a plurality of nozzles to which high pressure cooling fluid is supplied via a conduit system provided inside the cutting tool, wherein a first nozzle and a second nozzle collaborate in pairs to collide with each other above chips a short distance away from a cutting insert, thereby partializing the chips upwards and backwards.

Further, described in Japanese Patent Application Publication No. 2003-1525 is a structure of an oil feeding system whereby the cutting oil is injected from a skimmer nut provided at the end through the inside of a tool holder by making use of the cutting oil of a spindle inside oil feeding system of a machining center, wherein rotation is imparted to the cutting oil to increase the cooling efficiency of a cutting edge.

Techniques described in Japanese Patent Application Publication Nos.: 8-39387, 8-57742, and 2003-1545 cannot be applied to processing of, for example, an engine part of a complicated shape in a remote (secluded) position without space. Further, as shown in the technique of Japanese Patent Application Publication No. 2001-87906, in the case where a cutting fluid supply route penetrates the center of a main axis of a machining center, there is a problem that cut chips get into the cutting fluid supply route and then flow back to cause malfunction of a bearing section of the rotational axis.

BRIEF SUMMARY OF THE INVENTION

It is therefore an object of the present invention to provide an improved machine tool which can solve the problems stated above.

In order to attain this object, according to the present invention, a machine tool adapted to detachably mount a cutting tool holder on a rotational axis of a head is provided, in which a front cover is provided in front of the head and is formed with an opening which slidingly contacts an outer periphery of a flange section of the cutting tool holder. A cutting oil circulating channel is formed between the inner periphery of the opening and the outer periphery of the flange section of the cutting tool holder, and the cutting tool holder is provided with a cutting oil supply route consisting of a horizontal hole and a vertical hole, wherein the outer end of the horizontal hole serves as a cutting oil admission port opening into the cutting oil circulating channel. The inner end of the horizontal hole is connected to the lower end of the vertical hole, and the upper end of the vertical hole serves as a cutting oil injection port, opening into a position eccentric from the axis of the cutting tool holder, and wherein an angle of the rear surface of the horizontal hole relative to a tangent line based on the direction of rotation of the cutting tool holder is set larger than 90 degrees.

With this arrangement, the end section, that is, the cutting oil admission port, of the horizontal hole of the cutting oil supply route scoops up the cutting oil within the cutting oil circulating channel by rotation of the cutting tool holder to lead into the inside of the horizontal hole. Since the angle of the horizontal hole relative to the tangent line of the rear surface is set larger than 90 degrees, the cutting oil led into the inside of the horizontal hole does not return by a centrifugal force, but moves inwards to be supplied to the outside from the vertical hole.

Further, it is desirable that the entrance area of the cutting oil admission port opening into the cutting oil circulating channel be enlarged by cutting a corner section of the entrance wall surface of the cutting tool holder on the upstream side in the direction of rotation. In this manner, it is possible to secure the intake of the cutting oil.

EFFECT OF THE INVENTION

According to the present invention, even in the processing of a workpiece of a complicated shape such as a cylinder head, it is possible to fully supply the surface of the cutting tool with cutting oil to remarkably improve the life of the cutting tool.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE INVENTION

Figure 1:
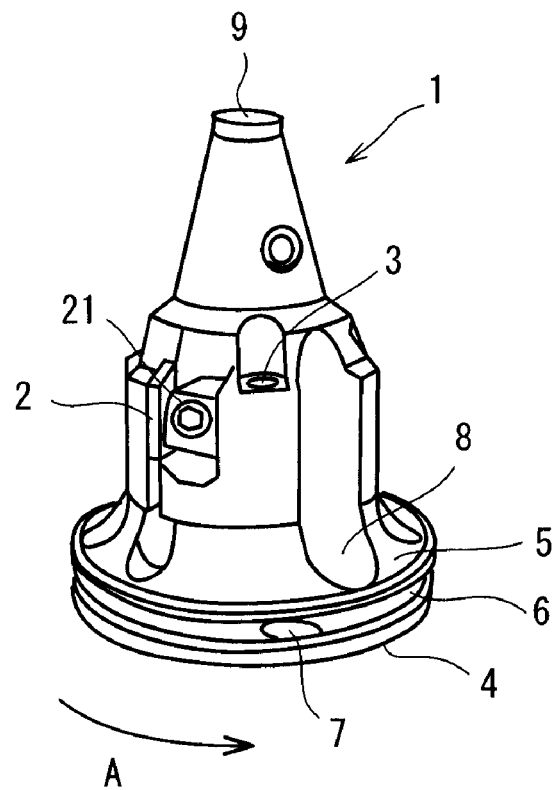
FIG. 1 is a perspective view of a cutting tool holder.
Figure 2:
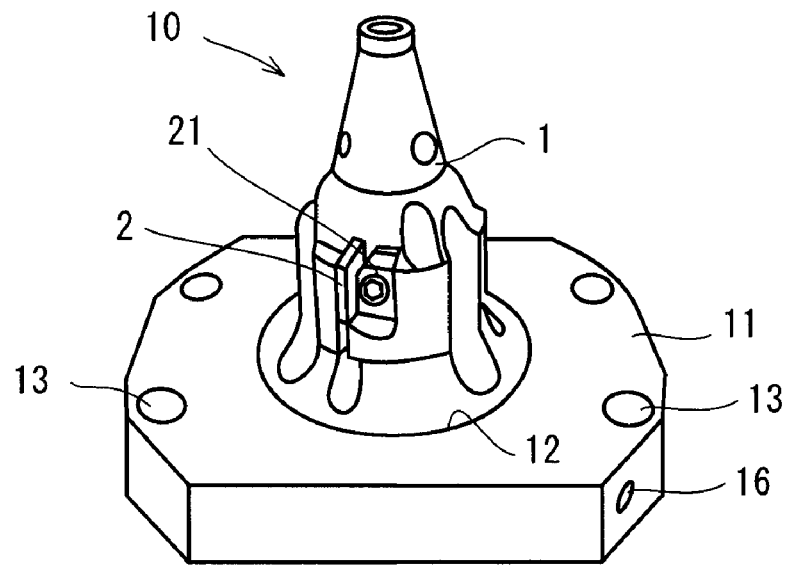
FIG. 2 is a perspective view of a cutting tool holder unit.
Figure 3:
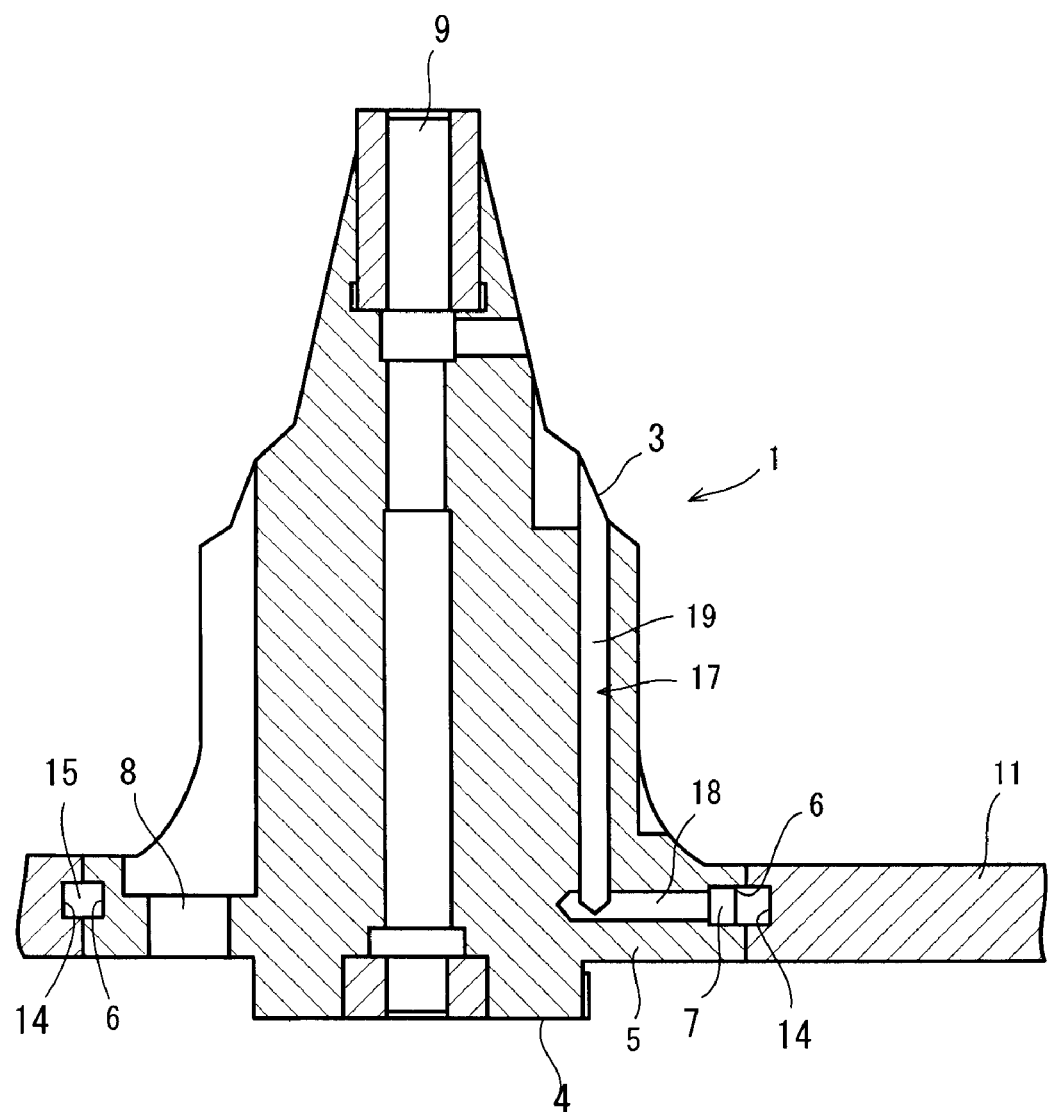
FIG. 3 is a cross-sectional view of the cutting tool holder.
Figure 4:
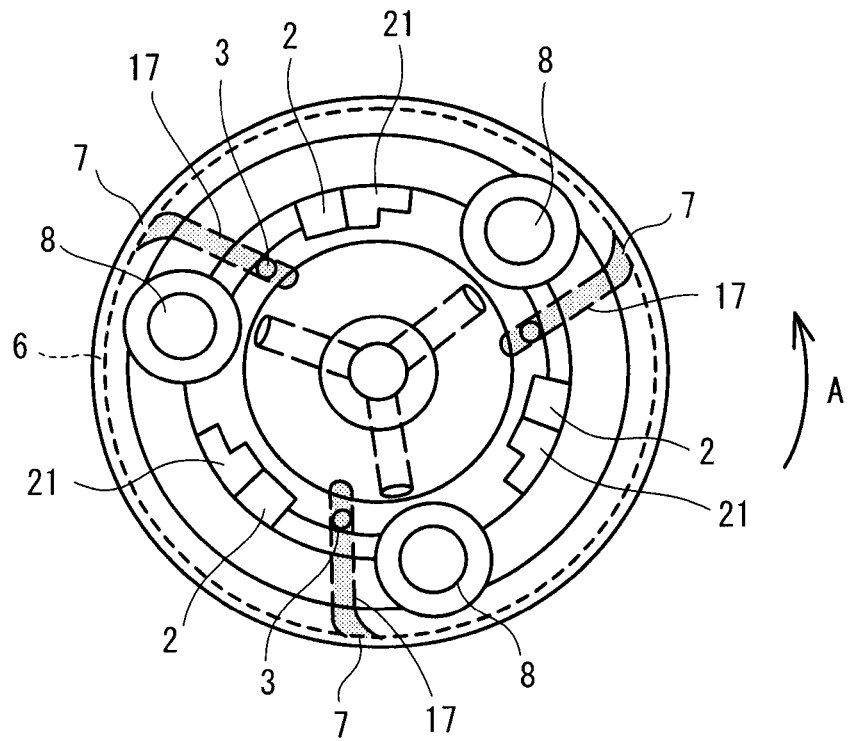
FIG. 4 is a back view of the cutting tool holder according to the present invention as seen from a side to be mounted on a multiple spindle head.
Figure 5:
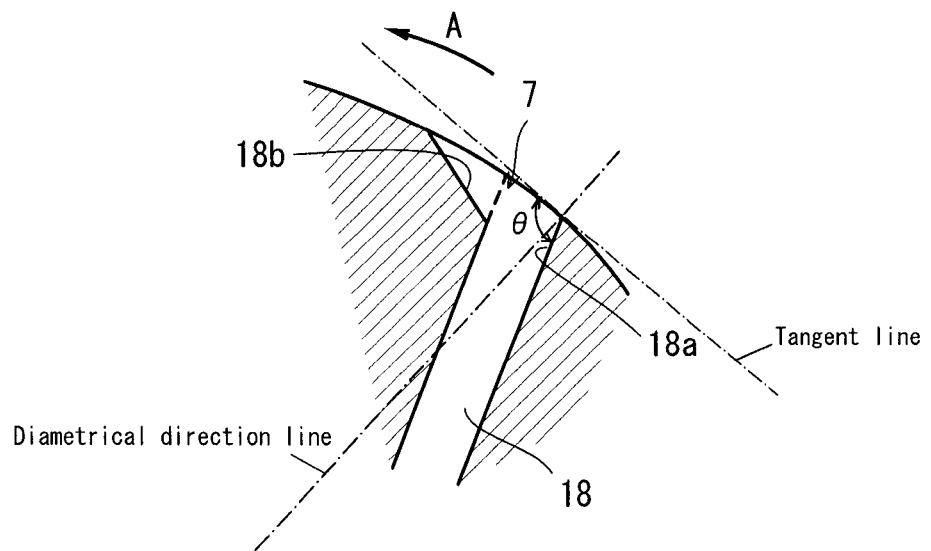
FIG. 5 is an enlarged view of a cutting oil admission port according to the present invention.

A preferred embodiment of the present invention will now be described with reference to the accompanying drawings. FIG. 1 is a perspective view of a cutting tool holder according to the present invention. FIG. 2 is a perspective view of a cutting tool holder unit and FIG. 3 is a cross-sectional view of the cutting tool holder. FIG. 4 is a back view of the cutting tool holder as seen from a side on which a multi-spindle head is mounted. FIG. 5 is a partially enlarged view of a cutting oil admission port.

A cutting tool 2 is detachably mounted on a cutting tool holder 1 by a clamp 21. A cutting oil injection port 3 is made open on the upstream side of rotation of the mounted cutting tool 2 as shown by an arrow A. In this embodiment, the number of cutting tools 2 is three in total and its cutting edge head shape is different respectively. In this manner, even a surface made of a hard sintered material such as a valve seat of a cylinder head can be cut at three stages to have a desired shape. The cutting oil injection port 3 not shown in the figure is also provided in the vicinity of the cutting tool 2.

On the other hand, a flange section 5 is formed at the bottom section of the cutting tool holder 1 and on the outside of a surface 4 of the holder 1 which is mounted on a multi-spindle head. Formed along the circumference of the outer periphery of the flange section 5 is a groove 6 in which a cutting oil admission port 7 is provided. In addition, a stud hole 8 for mounting the cutting tool holder 1 on the multi-spindle head and a valve guide insertion opening 9 for preventing an end section of the cutting tool holder 1 from vibrating during the cutting process are also provided separately.

As shown in FIG. 2, a cutting tool holder unit 10 is composed of a front cover 11 adapted to cover the end section of the multi-spindle head, and the cutting tool holder 1 which is rotatably fitted into an opening 12 of the front cover 11.

The front cover 11 is provided with four stud holes 13 for securing it to the multi-spindle head independent of the cutting tool holder 1. With this structure, the cutting tool holder 1 mounted on the multi-spindle head can be independently rotated for cutting, while the front cover 11 is secured to the multi-spindle head to supply the cutting oil.

As shown in FIG. 3 and FIG. 4, a groove 14 is formed along the circumference of the inner periphery of the opening 12 of the front cover 11 and forms a cutting oil circulating channel 15 together with a groove 6 in a condition in which the cutting tool holder 1 is fitted into the opening 12. Formed on the outer periphery of the front cover 11 is a cutting oil supply port 16.

The inside of the cutting tool holder 1 is drilled to provide a cutting oil supply route 17. The cutting oil supply route 17 is composed of a horizontal hole 18 provided in the direction perpendicular to the axial direction of the cutting tool holder 1 and a vertical hole 19 parallel to the axial direction and eccentric from the axis. The outer end of the horizontal hole 18 in the diametrical direction opens into the inside of the cutting oil circulating channel 15 to serve as the cutting oil admission port 7 and the inner end of the horizontal hole 18 in the diametrical direction is connected to the bottom end of the vertical hole 19. The end of the vertical hole 19 opens into the surface of the cutting tool holder 1 to serve as the cutting oil injection port 3.

As shown in FIG. 5, an angle θ of the horizontal hole 18 relative to a tangent line of a rear surface 18a is set larger than 90 degrees based on the direction of rotation of the cutting tool holder 1. Further, a section of a front surface 18b of the horizontal hole 18 forming the cutting oil admission port 7 is cut toward the front.

Thus, when the cutting tool holder 1 rotates, as the angle of the rear surface 18a of the cutting oil admission port 7 is larger than 90 degrees relative to a tangent line, the rear surface 18a scoops up the cutting oil of the cutting oil circulating channel 15 to take into the inside of the horizontal hole 18. The cutting oil taken in is supplied toward the center of the cutting tool holder 1 from the effect of rotation because the angle of the rear surface 18a continues to be larger than 90 degrees relative the tangent line. The cutting oil moves further through the vertical hole 19 to be injected from the cutting oil injection port 3.

Figure 6:
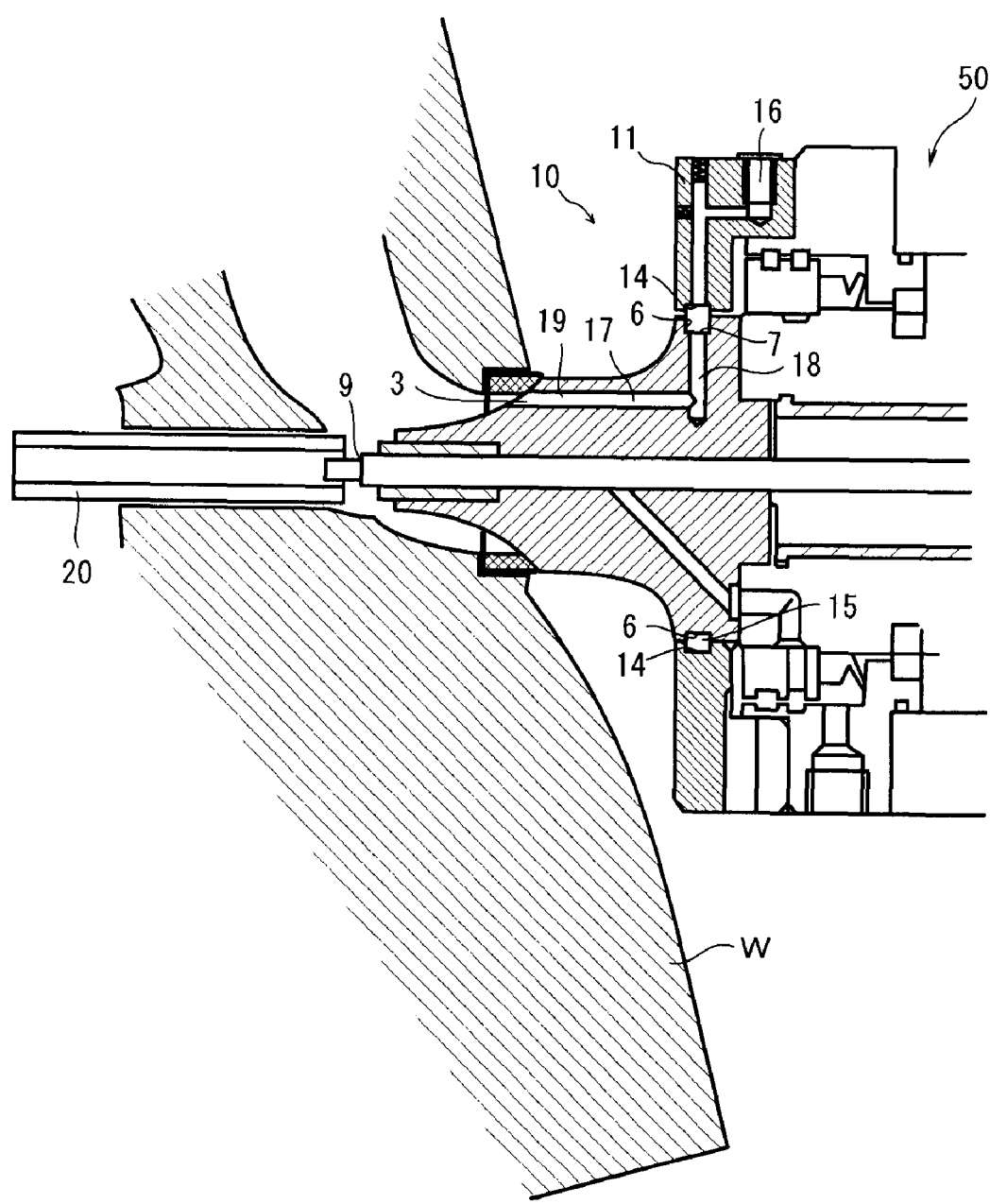
FIG. 6 is a cross-sectional view showing the condition in which the cutting tool holder unit according to the present invention is mounted on the multiple spindle head to cut a workpiece.

FIG. 6 is a cross-sectional view showing the condition in which the cutting tool holder unit according to the present invention is mounted on the multi-spindle head to cut the workpiece. Several cutting tool holder units 10 are mounted on a multi-spindle head 50 for processing. In the case of a cylinder head, four cutting tool holder units are mounted for, for example, a 4-cylinder engine. However, only one of these is shown in the present figure.

During cut-processing, as described above, the cutting oil is supplied from the cutting oil supply port 16 of the front cover 11 to the inside of the cutting oil circulating channel 15 formed by the grooves 6 and 14. Thus, the cutting oil within the cutting oil circulating channel 15 is sucked in the cutting oil admission port 7 by rotation of the cutting tool holder 1 and is injected from the cutting oil injection port 3 through the cutting oil supply route 17.

With this construction, when the workpiece W is cut-processed, the length of life of the cutting tool 2 is extended and the processing accuracy also improves because the cutting oil is stably supplied on the surface of the cutting tool 2. Further, in the case where the workpiece W is a cylinder head, if the cutting tool holder unit 10 according to the present invention is used, supply of the cutting oil to the cutting section is stably performed even though reaming is conducted on the section of a valve guide 20 because supply of the cutting oil to the cutting tool 2 is separately secured. If the reaming can be simultaneously conducted, a valve guide insertion port 9 for vibration deterrence can be effectively used for efficient processing.

A cutting tool holder unit according to the present invention can be utilized not only in the automobile industry, but also in all the metal cutting industries because the cutting oil can be stably supplied to the cutting tool. In particular, in the case of processing a workpiece having a hard cutting section such as a sintered material, processing efficiency can be improved and cost saving can also be expected because the life span of the cutting tool can be extended.

The invention claimed is:

1. A cutting tool holder unit that is adapted to be detachably mounted on a rotational axis of a head of a machine tool, the cutting tool holder unit, comprising:
   a cutting tool holder;
   a front cover provided in front of the head and formed with an opening that slidingly contacts an outer periphery of a flange section of the cutting tool holder,
   wherein a cutting oil circulating channel is formed between an inner periphery of the opening and the outer periphery of the flange section of the cutting tool holder, and
   a cutting oil supply route comprising
      a horizontal hole with an inner end and an outer end, wherein the outer end serves as a cutting oil admission port opening into the cutting oil circulating channel, and
      a vertical hole with an upper end and a lower end, wherein the inner end of the horizontal hole is connected to the lower end of the vertical hole, and wherein the upper end of the vertical hole serves as a cutting oil injection port opening into a position eccentric from an axis of the cutting tool holder on an upstream side of a cutting tool in a direction of rotation of the cutting tool holder, and an angle of a rear surface of the horizontal hole relative to a tangent line based on the direction of rotation of the cutting tool holder set larger than 90 degrees.

2. The cutting tool holder unit according to claim 1, wherein an entrance area of the cutting oil admission port opening into the cutting oil circulating channel is enlarged by cutting a corner section of an entrance wall surface of the cutting tool holder on the upstream side in the direction of rotation.

* * * * *